US012578783B2

(12) United States Patent
Cowburn et al.

(10) Patent No.: US 12,578,783 B2
(45) Date of Patent: Mar. 17, 2026

(54) ADDRESSABLE AUGMENTED-REALITY CONTENT

(71) Applicant: Snap Inc., Santa Monica, CA (US)

(72) Inventors: Piers Cowburn, London (GB); David Li, London (GB); Isac Andreas Müller Sandvik, London (GB); Qi Pan, London (GB)

(73) Assignee: Snap Inc., Santa Monica, CA (US)

( * ) Notice: Subject to any disclaimer, the term of this patent is extended or adjusted under 35 U.S.C. 154(b) by 367 days.

(21) Appl. No.: 17/828,885

(22) Filed: May 31, 2022

(65) Prior Publication Data

US 2022/0291787 A1    Sep. 15, 2022

Related U.S. Application Data

(63) Continuation of application No. 16/457,505, filed on Jun. 28, 2019, now Pat. No. 11,397,503.

(51) Int. Cl.
*G06F 3/01* (2006.01)
*G06F 3/0481* (2022.01)
(Continued)

(52) U.S. Cl.
CPC ............ *G06F 3/011* (2013.01); *G06F 3/0481* (2013.01); *G06F 3/04842* (2013.01); *G06F 3/14* (2013.01);
(Continued)

(58) Field of Classification Search
CPC ........ G06F 3/011; G06F 18/24; G06F 3/0481; G06F 3/04842; G06F 3/14; G06T 11/00;
(Continued)

(56) References Cited

U.S. PATENT DOCUMENTS 8,953,889 B1    2/2015    Worley, III et al.
9,922,226 B1    3/2018    Boyd et al.
(Continued)

FOREIGN PATENT DOCUMENTS

CN    106020437 A    10/2016
CN    107305435 A    10/2017
(Continued)

OTHER PUBLICATIONS

Ajanki, A., Billinghurst, M., Gamper, H., Järvenpää, T., Kandemir, M., Kaski, S., . . . & Tossavainen, T. (2011). An augmented reality interface to contextual information. Virtual reality, 15, 161-173. (Year: 2011).*

(Continued)

*Primary Examiner* — Jonathan S Lee
(74) *Attorney, Agent, or Firm* — Schwegman Lundberg & Woessner, P.A.

(57) ABSTRACT

An addressable media system for performing operations that include: accessing image data that depicts an object in an environment at a client device; causing display of a presentation of the image data within a graphical user interface at the client device; detecting the display of the object within the presentation of the image data based on at least a portion of the plurality of image features of the display of the object; identifying an object class based on at least the portion of the image features of the display of the object; receiving an input that selects the display of the object from the client device; and associating the object class that corresponds with the object with the user profile in response to the input that selects the display of the object.

20 Claims, 12 Drawing Sheets

400

ACCESSING IMAGE DATA THAT DEPICTS AN OBJECT IN AN ENVIRONMENT AT A CLIENT DEVICE, THE CLIENT DEVICE ASSOCIATED WITH A USER PROFILE
402

CAUSING DISPLAY OF A PRESENTATION OF THE IMAGE DATA WITHIN A GRAPHICAL USER INTERFACE (GUI) AT THE CLIENT DEVICE, THE PRESENTATION OF THE IMAGE DATA INCLUDING A DISPLAY OF THE OBJECT AT A POSITION WITHIN THE PRESENTATION OF THE IMAGE DATA
404

DETECTING THE DISPLAY OF THE OBJECT WITHIN THE PRESENTATION OF THE IMAGE DATA BASED ON IMAGE FEATURES OF THE DISPLAY OF THE OBJECT
406

IDENTIFYING AN OBJECT CLASS BASED ON AT LEAST THE IMAGE FEATURES OF THE DISPLAY OF THE OBJECT, RESPONSIVE TO THE DETECTING THE DISPLAY OF THE OBJECT WITHIN THE PRESENTATION OF THE IMAGE DATA
408

RECEIVING AN INPUT THAT SELECTS THE DISPLAY OF THE OBJECT FROM THE CLIENT DEVICE
410

ASSOCIATING THE OBJECT CLASS THAT CORRESPONDS WITH THE OBJECT WITH THE USER PROFILE IN RESPONSE TO THE INPUT THAT SELECTS THE DISPLAY OF THE OBJECT
412

(51) Int. Cl.

| | | |
|---|---|---|
| *G06F 3/04842* | (2022.01) | |
| *G06F 3/14* | (2006.01) | |
| *G06F 18/24* | (2023.01) | |
| *G06T 11/00* | (2006.01) | |
| *H04L 67/306* | (2022.01) | |

(52) U.S. Cl.
CPC .............. *G06F 18/24* (2023.01); *G06T 11/00* (2013.01); *H04L 67/306* (2013.01); *G06T 2210/12* (2013.01)

(58) Field of Classification Search
CPC .. G06T 2210/12; H04N 167/306; H04L 67/01
USPC ........................................................ 382/103
See application file for complete search history.

(56) References Cited

U.S. PATENT DOCUMENTS

| | | | |
|---|---|---|---|
| 11,397,503 | B2 | 7/2022 | Cowburn et al. |
| 2013/0044128 | A1 | 2/2013 | Liu et al. |
| 2014/0172570 | A1 | 6/2014 | Arcas et al. |
| 2014/0232750 | A1 | 8/2014 | Price |
| 2015/0262219 | A1 | 9/2015 | Vock et al. |
| 2017/0232335 | A1 | 8/2017 | Williams et al. |
| 2017/0232348 | A1 | 8/2017 | Williams et al. |
| 2017/0262154 | A1 | 9/2017 | Black et al. |
| 2018/0121762 | A1 | 5/2018 | Han et al. |
| 2018/0122149 | A1 | 5/2018 | Tsurumi |
| 2018/0350055 | A1 | 12/2018 | Cardenas Bernal |
| 2019/0102646 | A1 | 4/2019 | Redmon et al. |
| 2019/0244267 | A1 | 8/2019 | Rattner et al. |
| 2020/0111267 | A1 | 4/2020 | Stauber et al. |
| 2020/0409511 | A1 | 12/2020 | Cowburn et al. |

FOREIGN PATENT DOCUMENTS

| | | |
|---|---|---|
| CN | 107450088 A | 12/2017 |
| CN | 114041104 B | 6/2024 |
| CN | 118860128 A | 10/2024 |
| EP | 2444918 A2 | 4/2012 |
| KR | 20160022805 A | 3/2016 |
| KR | 102799859 B1 | 4/2025 |
| WO | WO-2020264555 A1 | 12/2020 |

OTHER PUBLICATIONS

Cordeiro, Diogo, Nuno Correia, and Rui Jesus. "ARZombie: A mobile augmented reality game with multimodal interaction." 2015 7th International Conference on Intelligent Technologies for Interactive Entertainment (Intetain). IEEE, 2015. (Year: 2015).*

Narayanan, R., Rangan, V., Gopalakrishnan, U., & Hariharan, B. (Jun. 2016). The gesture triggered face tracking for enhanced e-learning systems. In 11th International Conference on e-Learning (p. 190). (Year: 2016).*

Anagnostopoulos, Vasilis, et al. "Gaze-Informed location-based services." International Journal of Geographical Information Science 31.9 (2017): 1-28. (Year: 2017).*

Hariharan, Balaji, S. Padmini, and Uma Gopalakrishnan. "Gesture recognition using Kinect in a virtual classroom environment." 2014 Fourth International Conference on Digital Information and Communication Technology and its Applications (DICTAP). IEEE, 2014. (Year: 2014).*

Laielli, Michael, et al. "Labelar: a spatial guidance interface for fast computer vision image collection." Proceedings of the 32nd annual ACM symposium on user interface software and technology. 2019. (Year: 2019).*

U.S. Appl. No. 16/457,505, filed Jun. 28, 2019, Association of User Identifiers to Augmented-Reality Content (as amended).

"U.S. Appl. No. 16/457,505, Advisory Action mailed Feb. 18, 2022", 3 pgs.

"U.S. Appl. No. 16/457,505, Final Office Action mailed Mar. 25, 2021", 23 pgs.

"U.S. Appl. No. 16/457,505, Final Office Action mailed Aug. 9, 2021", 25 pgs.

"U.S. Appl. No. 16/457,505, Final Office Action mailed Dec. 3, 2021", 24 pgs.

"U.S. Appl. No. 16/457,505, Non Final Office Action mailed Jul. 8, 2021", 23 pgs.

"U.S. Appl. No. 16/457,505, Non Final Office Action mailed Oct. 16, 2020", 22 pgs.

"U.S. Appl. No. 16/457,505, Non Final Office Action mailed Oct. 18, 2021", 25 pgs.

"U.S. Appl. No. 16/457,505, Notice of Allowance mailed Mar. 22, 2022", 14 pgs.

"U.S. Appl. No. 16/457,505, Response filed Feb. 3, 2022 to Final Office Action mailed Dec. 3, 2021", 10 pgs.

"U.S. Appl. No. 16/457,505, Response filed May 25, 2021 to Final Office Action mailed Mar. 25, 2021", 10 pgs.

"U.S. Appl. No. 16/457,505, Response filed Jul. 13, 2021 to Non Final Office Action mailed Jul. 8, 2021", 10 pgs.

"U.S. Appl. No. 16/457,505, Response filed Oct. 5, 2021 to Final Office Action mailed Aug. 9, 2021", 9 pgs.

"U.S. Appl. No. 16/457,505, Response filed Nov. 18, 2021 to Non Final Office Action mailed Oct. 18, 2021", 10 pgs.

"U.S. Appl. No. 16/457,505, Response filed Dec. 18, 2020 to Non Final Office Action mailed Oct. 16, 2020", 13 pgs.

"International Application Serial No. PCT/US2020/070169, International Preliminary Report on Patentability mailed Jan. 6, 2022", 9 pgs.

"International Application Serial No. PCT/US2020/070169, International Search Report mailed Oct. 5, 2020", 4 pgs.

"International Application Serial No. PCT/US2020/070169, Written Opinion mailed Oct. 5, 2020", 7 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Szegedy, Christian, et al., "Deep Neural Networks for Object Detection", Advances in Neural Information Processing Systems 26, (2013), 9 pgs.

"Chinese Application Serial No. 202080047875, Response filed Apr. 21, 2024 to Office Action mailed Sep. 21, 2023", w/ English Claims, 11 pgs.

"Chinese Application Serial No. 202080047875.0, Office Action mailed Sep. 21, 2023", w/ English Translation, 13 pgs.

"European Application Serial No. 20743042.2, Communication Pursuant to Article 94(3) EPC mailed May 17, 2024", 6 pgs.

"European Application Serial No. 20743042.2, Response Filed Aug. 5, 2022 to Communication pursuant to Rules 161(1) and 162 EPC mailed Feb. 4, 2022", 27 pgs.

"European Application Serial No. 20743042.2, Response filed Sep. 12, 2024 to Communication Pursuant to Article 94(3) EPC mailed May 17, 2024", 20 pgs.

"Korean Application Serial No. 10-2022-7002736, Notice of Preliminary Rejection mailed Apr. 28, 2024", w/ English translation, 10 pgs.

"Korean Application Serial No. 10-2022-7002736, Response filed Jun. 28, 2024 to Office Actioned mailed Apr. 28, 2024", w/ English Claims, 24 pgs.

"Chinese Application Serial No. 202080047875, Response filed Feb. 6, 2024 to Office Action mailed Sep. 21, 2023", w/ English claims, 14 pgs.

"Chinese Application Serial No. 202410806415.1, Response filed Sep. 24, 2024 to Notification to Make Rectification mailed Aug. 9, 2024", w/ English claims, 44 pgs.

* cited by examiner

100

NETWORK (E.G., THE INTERNET) 106

CLIENT DEVICE(S) 102

MESSAGING CLIENT APPLICATION 104

API SERVER 110

APPLICATION SERVER 112

MESSAGING SERVER APPLICATION 114

IMAGE PROCESSING SYSTEM 116

SOCIAL NETWORK SYSTEM 122

ADDRESSABLE MEDIA SYSTEM 124

DATABASE SERVER(S) 118

DATABASE(S) 120

MESSAGING SERVER SYSTEM 108

100

MESSAGING CLIENT APPLICATION
104

EPHEMERAL TIMER SYSTEM 202

COLLECTION MANAGEMENT SYSTEM 204

ANNOTATION SYSTEM 206

CURATION INTERFACE 208

APPLICATION SERVER
112

300

ADDRESSABLE MEDIA SYSTEM 124

PROCESSORS
310

IMAGE MODULE 302

MACHINE-VISION MODULE 304

AR MODULE 306

PRESENTATION MODULE 308

Figure 4:
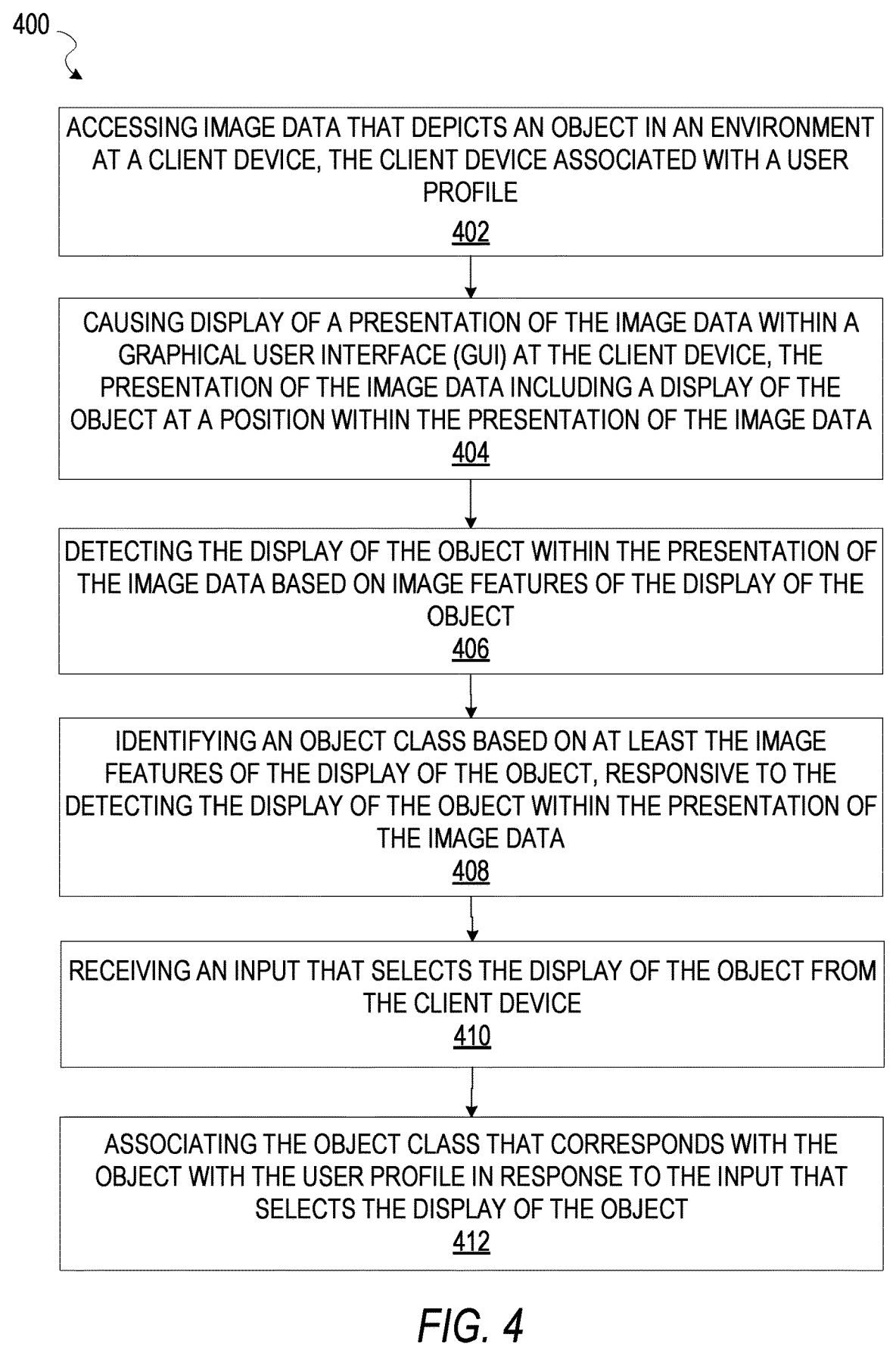

400

ACCESSING IMAGE DATA THAT DEPICTS AN OBJECT IN AN ENVIRONMENT AT A CLIENT DEVICE, THE CLIENT DEVICE ASSOCIATED WITH A USER PROFILE
402

CAUSING DISPLAY OF A PRESENTATION OF THE IMAGE DATA WITHIN A GRAPHICAL USER INTERFACE (GUI) AT THE CLIENT DEVICE, THE PRESENTATION OF THE IMAGE DATA INCLUDING A DISPLAY OF THE OBJECT AT A POSITION WITHIN THE PRESENTATION OF THE IMAGE DATA
404

DETECTING THE DISPLAY OF THE OBJECT WITHIN THE PRESENTATION OF THE IMAGE DATA BASED ON IMAGE FEATURES OF THE DISPLAY OF THE OBJECT
406

IDENTIFYING AN OBJECT CLASS BASED ON AT LEAST THE IMAGE FEATURES OF THE DISPLAY OF THE OBJECT, RESPONSIVE TO THE DETECTING THE DISPLAY OF THE OBJECT WITHIN THE PRESENTATION OF THE IMAGE DATA
408

RECEIVING AN INPUT THAT SELECTS THE DISPLAY OF THE OBJECT FROM THE CLIENT DEVICE
410

ASSOCIATING THE OBJECT CLASS THAT CORRESPONDS WITH THE OBJECT WITH THE USER PROFILE IN RESPONSE TO THE INPUT THAT SELECTS THE DISPLAY OF THE OBJECT
412

DETECTING A SECOND DISPLAY OF THE OBJECT AT A SECOND CLIENT
DEVICE
502

IDENTIFYING THE OBJECT CLASS OF THE OBJECT
504

RETRIEIVING AN IDENTIFIER ASSOCIATED WITH THE USER PROFILE
ASSOCIATED WITH THE OBJECT CLASS
506

CAUSING DISPLAY OF THE IDENTIFIER ASSOCIATED WITH THE USER
PROFILE AT THE SECOND CLIENT DEVICE RESPONSIVE TO THE
DETECTING THE SECON
508

600

RECEIVING A SECOND INPUT THAT SELECTS A SECOND DISPLAY OF THE OBJECT FROM A SECOND CLIENT DEVICE
602

DISASSOCIATING THE OBJECT CLASS FROM THE FIRST USER PROFILE
604

ASSOCIATING THE OBJECT CLASS THAT CORRESPONDS WITH THE OBJECT WITH A SECOND USER PROFILE IN RESPONSE TO THE SECOND INPUT
606

800

805

810    102

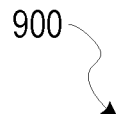
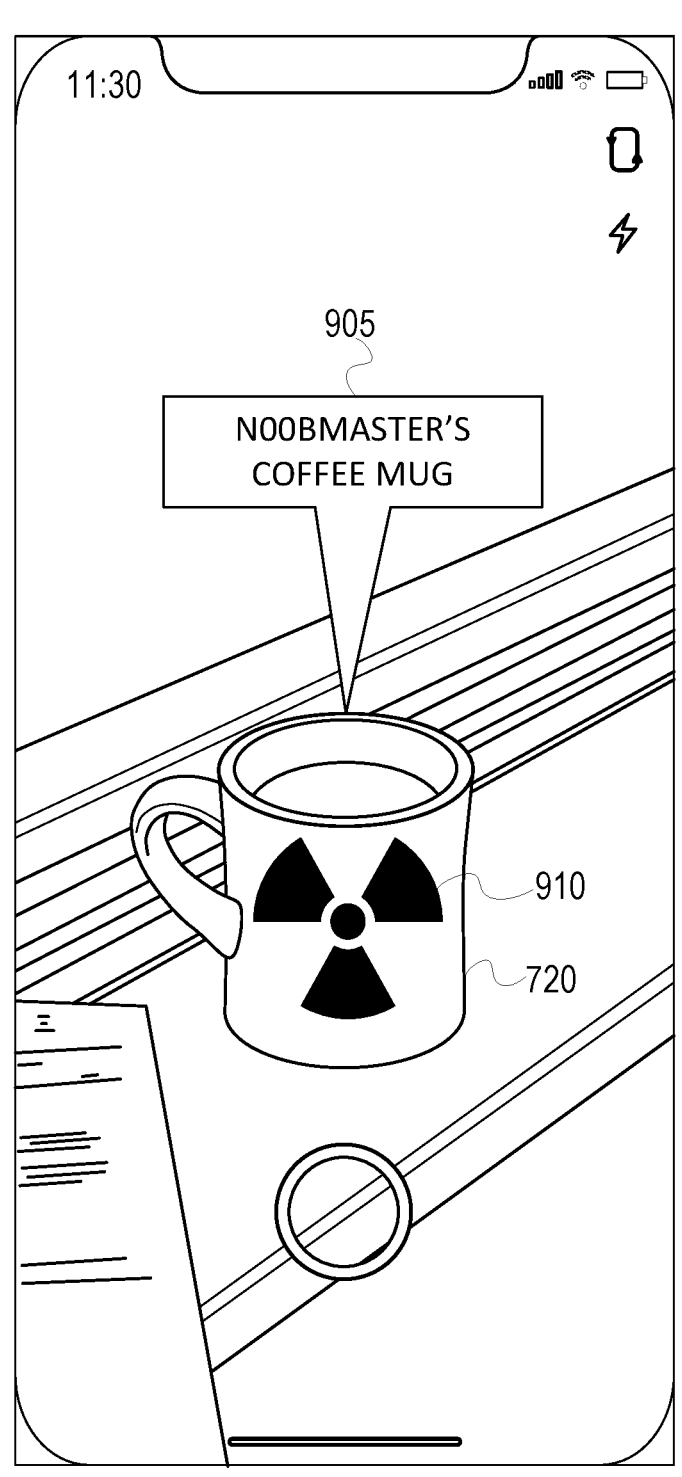
*FIG. 9*

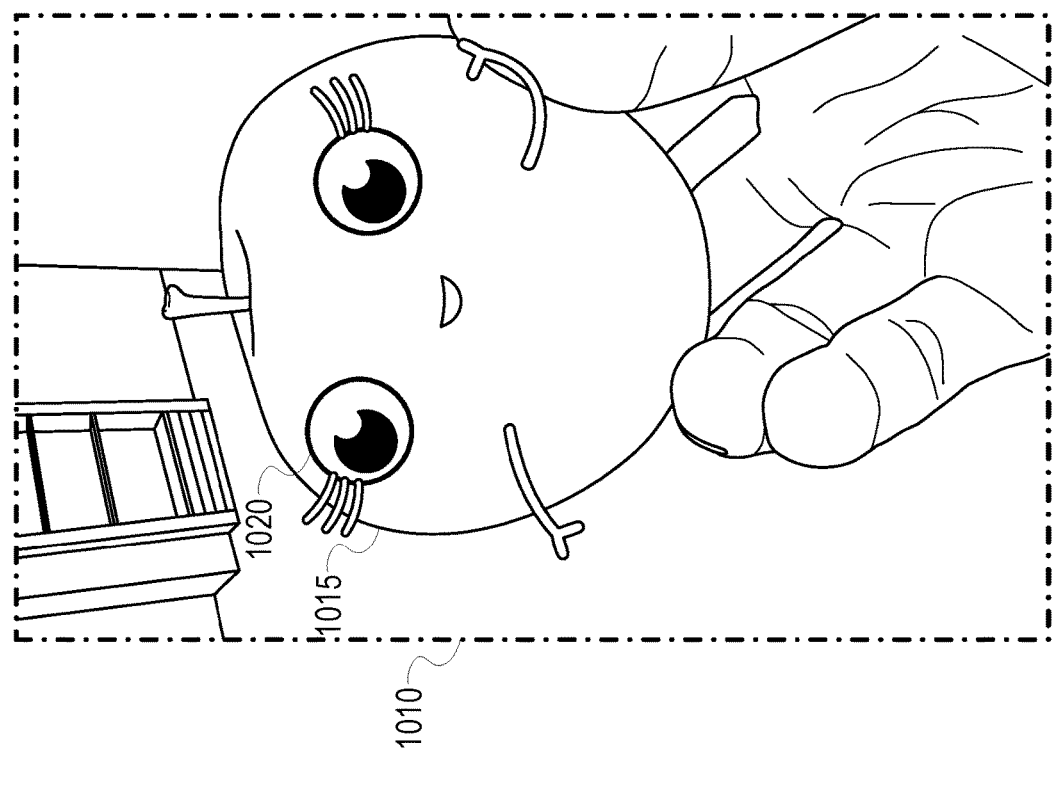
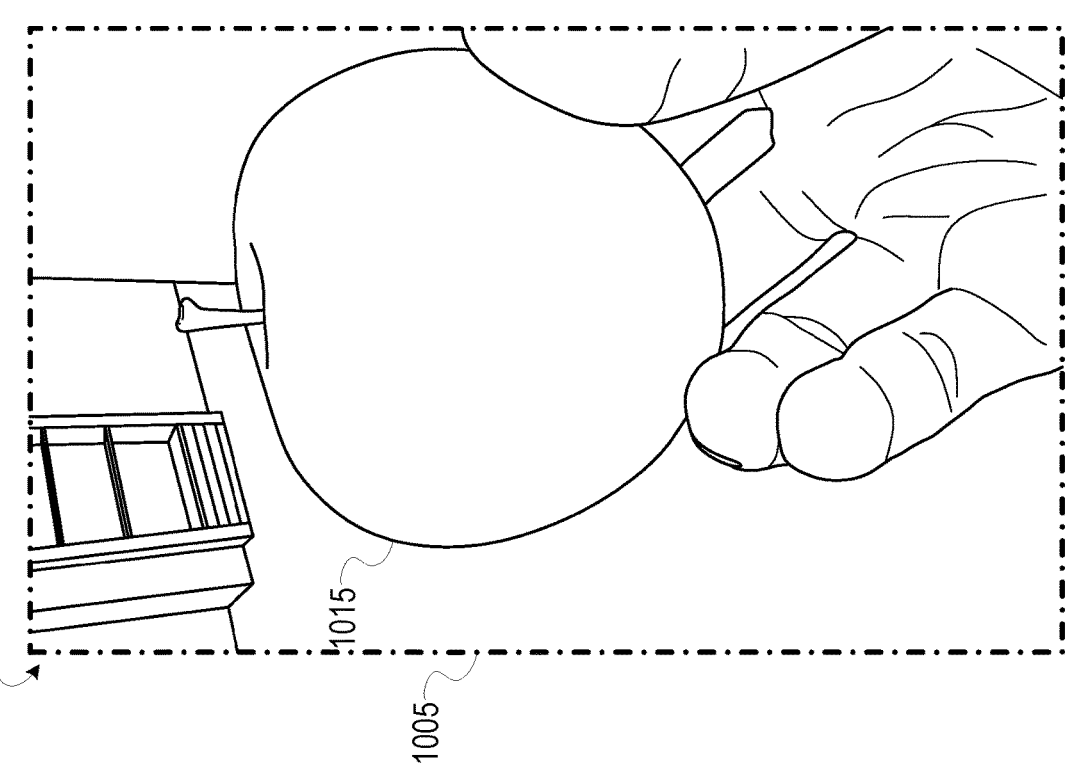
FIG. 10

1200

ADDRESSABLE AUGMENTED-REALITY CONTENT

CROSS-REFERENCE TO RELATED APPLICATION

This application is a continuation of U.S. patent application Ser. No. 16/457,505, filed Jun. 28, 2019, which is incorporated by reference herein in its entirety.

TECHNICAL FIELD

Embodiments of the present disclosure relate generally to Augmented-Reality (AR) media, and more particularly, to systems to enable the addressability of AR media.

BACKGROUND

Augmented reality (AR) is an interactive experience of a real-world environment where the objects that reside in the real-world environment are enhanced by computer-generated perceptual information, sometimes across multiple sensory modalities. The overlaid sensory information (i.e., media content) can be constructive (i.e., additive to the natural environment) or destructive (i.e., masking of the natural environment) and is seamlessly interwoven with the physical world such that it is perceived as an immersive aspect of the real-world environment.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart illustrating a method for associating an object class with a user profile, according to certain example embodiments.

FIG. 9 is an interface diagram depicting AR content presented at a client device, according to certain example embodiments.

FIG. 10 is an interface diagram depicting AR content presented at a client device, according to certain example embodiments.

DETAILED DESCRIPTION

Figure 1:
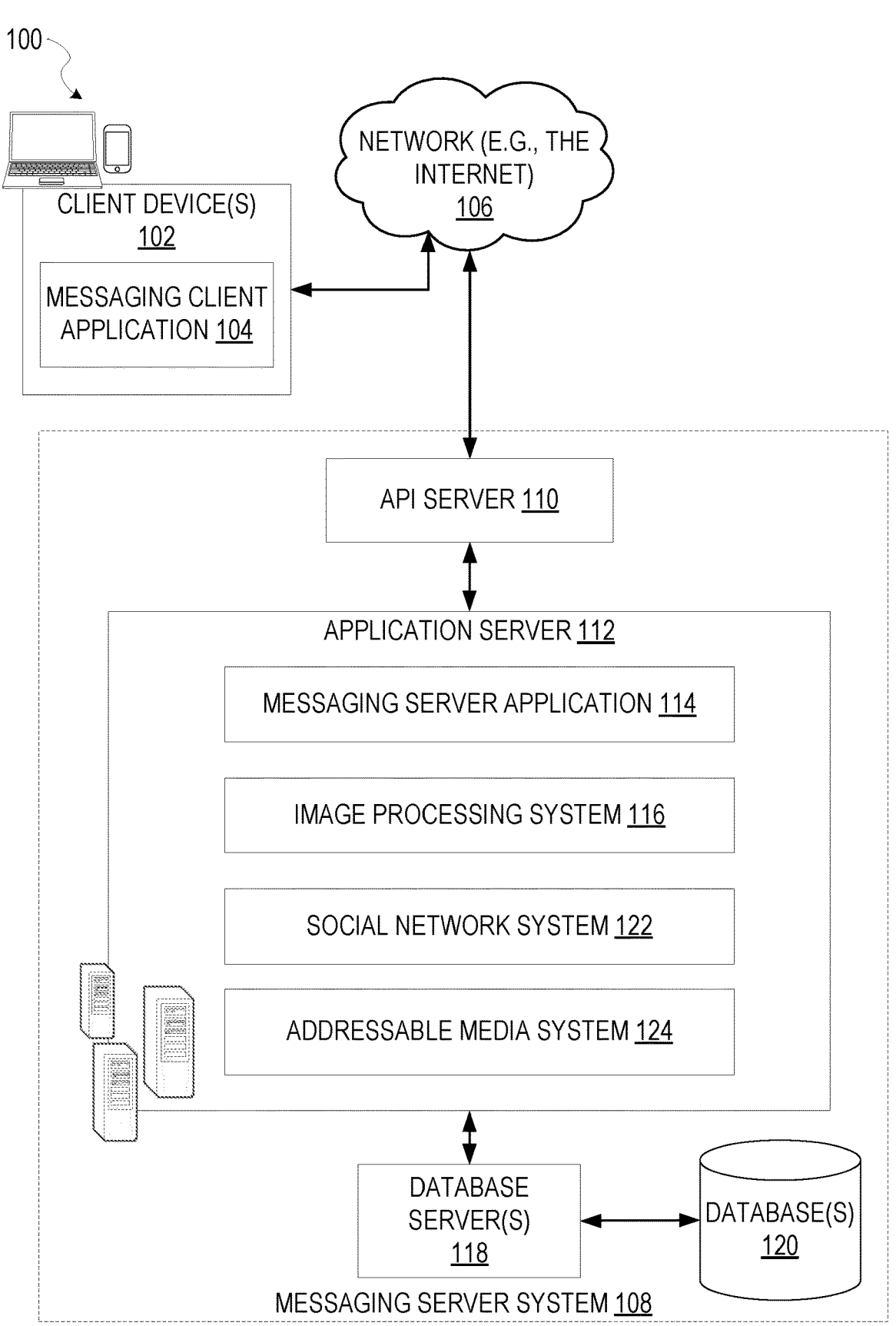
FIG. 1 is a block diagram showing an example messaging system for exchanging data (e.g., messages and associated content) over a network in accordance with some embodiments, wherein the messaging system includes an addressable media system.

As discussed above, AR is an interactive experience of a real-world environment where the objects that reside in the real-world environment may be enhanced through the addition of computer-generated perceptual information, sometimes across multiple sensory modalities. The overlaid sensory information (i.e., media content) may be additive to the natural environment through the addition of media content, or destructive to the natural environment by masking of the natural environment. Accordingly, the AR media is seamlessly interwoven with the physical world such that it is perceived as an immersive aspect of the real-world environment.

In certain example embodiments discussed herein, an AR system may employ computer vision and image processing techniques for the purposes of object detection, in order to detect semantic objects of certain classes in digital images and videos, enabling the AR system to more accurately and seamlessly present the AR media within a presentation of the real-world environment.

In accordance with some embodiments described herein, an addressable media system may be or include any instrumentality or aggregate of instrumentalities operable to compute, process, store, display, generate, communicate, or apply various forms of data for performing operations that include: accessing image data that depicts an object in an environment at a client device, wherein the client device is associated with a user profile; causing display of a presentation of the image data within a graphical user interface (GUI) at the client device, wherein the presentation of the image data includes a display of the object at a position within the presentation of the image data, and the display of the object comprises a plurality of image features; detecting the display of the object within the presentation of the image data based on at least a portion of the plurality of image features of the display of the object; identifying an object class based on at least the portion of the image features of the display of the object, responsive to the detecting the display of the object within the presentation of the image data; receiving an input that selects the display of the object from the client device, through the GUI; and associating the object class that corresponds with the object with the user profile in response to the input that selects the display of the object.

In some embodiments, the addressable media system may perform one or more computer vision and image processing techniques to detect and identify attributes of objects displayed within presentations of image data within the GUI. For example, in such embodiments, a plurality of object classes may be associated with corresponding features that classify the class (i.e., circles are round). Accordingly, the addressable media system may maintain a database that comprises object classes, wherein each object class comprises a corresponding set of image features that identify the object classes. In certain embodiments, a user or administrator of the addressable media system may define custom object classes by providing inputs that identify and define features to be associated with the object class. For example, a user may provide inputs selecting an object within a presentation of a space, and in response, the addressable media system may parse a display of the object within a presentation of image data in order to identify the identifying features.

In some embodiments, responsive to detecting and identifying a display of an object within a presentation of image data, the addressable media system causes display of a graphical indicator to highlight the display of the object. The graphical indicator may include graphical properties that correspond with the object class of the object. For example, a color, size, and shape of the graphical indicator may be associated with each object class.

In some embodiments, responsive to receiving an input that selects the display of the object within the presentation at the client device, the addressable media system associates the object class of the object with a user profile associated with the client device. For example, associating the object class of the object with the user profile may include associating a user identifier associated with the user profile with the object class and its corresponding image features within a media repository or database of the addressable media system.

In certain example embodiments, a user may provide inputs modifying the display of objects that correspond with object classes associated with their user profile. For example, the addressable media system may provide an interface to the user at the client device, where the user may provide inputs to apply AR media to objects of the object classes. Accordingly, when the objects are displayed to other users, the displays of the objects may be modified based on the AR media applied by the user. As an illustrative example, a user may provide an input selecting a soda can, which causes the addressable media system to associate an object class corresponding with "soda cans" to their user profile. The user may then provide an input to apply AR media to objects corresponding with the object class. For example, the AR media may include an overlay that displays a username of the user upon a display of objects corresponding with the object class. Accordingly, a second user may encounter and display an object corresponding with the soda can at their device (a second device). Responsive to detecting and identifying the object, the addressable media system applies the AR media defined by the user associated with the corresponding object class to the display of the object at the second device.

In some embodiments, the addressable media system may have one or more conditions required to associate an object class with a user profile, in addition to receiving a selection of a display of an object of the object class. For example, in some embodiments, the conditions may include multiple selections of displays of objects of the object classes, such that a user must select a threshold number of objects of the object class in order to receive the association of the object class. The threshold number of objects may be defined based on predefined values, or in some embodiments may be a relative value, such that a user with "the most" selections from among their social network, or within a geo-fences area, may receive the association. Accordingly, a user may lose the association of the object class with their user profile subsequent to another user selecting a greater number of objects, or in some embodiments based on the user leaving the geo-fenced area.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an addressable media system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
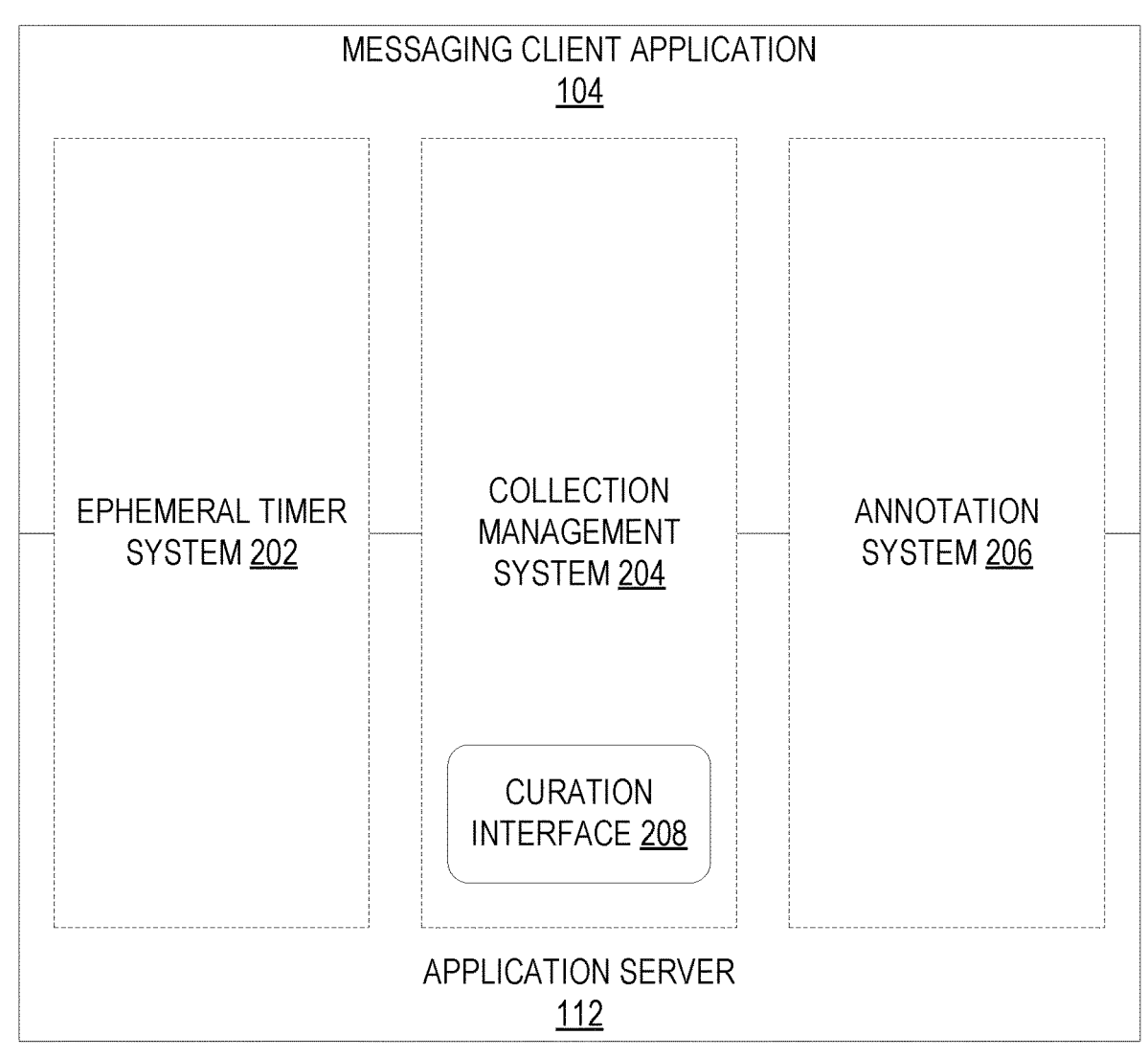
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content, such as user support content received by the user to be forwarded or redistributed to one or more recipients. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
FIG. 3 is a block diagram illustrating various modules of an addressable media system, according to certain example embodiments.

In another example embodiment, the annotation system 206 provides a merchant-based publication platform that enables merchants to select a particular media overlay associated with a geolocation. For example, the annotation system 206 associates the media overlay of a highest bidding merchant with a corresponding geolocation for a predefined amount of time FIG. 3 is a block diagram illustrating components of the addressable media system 124 that configure the addressable media system 124 to perform operations that include: accessing image data that depicts an object in an environment at a client device, wherein the client device is associated with a user profile; causing display of a presentation of the image data within a GUI at the client device, wherein the presentation of the image data includes a display of the object at a position within the presentation of the image data, and the display of the object comprises a plurality of image features; detecting the display of the object within presentation of the image data based on at least a portion of the plurality of image features of the display of the object; identifying an object class based on at least the portion of the image features of the display of the object, responsive to the detecting the display of the object within the presentation of the image data; receiving an input that selects the display of the object from the client device, through the GUI; and associating the object class that corresponds with the object with the user profile in response to the input that selects the display of the object, according to certain example embodiments.

The addressable media system 124 is shown as including an image module 302, a machine-vision module 304, an AR module 306, and a presentation module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the addressable media system 124 may physically include an arrangement of one or more of the processors 310 (e.g., a subset of or among the one or more processors of the machine) configured to perform the operations described herein for that module. As another example, any module of the addressable media system 124 may include software, hardware, or both, that configure an arrangement of one or more processors 310 (e.g., among the one or more processors of the machine) to perform the operations described herein for that module. Accordingly, different modules of the addressable media system 124 may include and configure different arrangements of such processors 310 or a single arrangement of such processors 310 at different points in time. Moreover, any two or more modules of the addressable media system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart illustrating a method 400 for associating an object class with a user profile, according to certain example embodiments. Operations of the method 400 may be performed by the modules described above with respect to FIG. 3. As shown in FIG. 4, the method 400 includes one or more operations 402, 404, 406, 408, 410, and 412.

At operation 402, the image module 302 accesses image data that depicts an object in an environment at a client device 102, where the client device 102 is associated with a user profile. For example, a user of the client device 102 may login to an application executed by the client device 102, such as the messaging client application 104.

The image data may comprise a data stream of image and video data captured by a camera associated with the client device 102. For example, the client device 102 may include a camera configured to generate and stream image data.

At operation 404, the presentation module 308 generates and causes display of a presentation of the image data within a GUI at the client device 102, wherein the presentation of the image data includes a display of the object at a position within the environment displayed within the presentation. For example, the messaging client application 104 may cause display of a specially configured interface to display the presentation of image data generated by the presentation module 308.

At operation 406, the machine-vision module 304 detects the display of the object within the presentation of the image data at the client device, based on the image features of the display of the object. The machine-vision module 304 may apply one or more object detection techniques including machine learning based approaches, as well as deep learning based approaches.

For example, the machine learning based approaches may include the Viola-Jones object detection framework based on Haar features, scale-invariant feature transforms (SIFT), as well as histogram of oriented gradients features. The deep learning based approaches may include region proposals, single shot multibox detector, as well as You Only Look Once (YOLO).

At operation 408, based on the detection of the display of the object within the presentation of the image data at the client device 102, the machine-vision module 304 identifies an object class. For example, the object class may be identified based on at least a portion of the image features of the display of the object.

At operation 410, the presentation module 308 receives an input that selects the display of the object from the client device 102. For example, a user of the client device 102 may provide a tactile input that selects or otherwise identifies the display of the object within the presentation of the image data through the GUI. Responsive to the presentation module 308 receiving the input that selects the display of the object, at operation 412, the AR module 306 associates the object class that corresponds with the object with a user profile of the user.

In some embodiments, associating the object class that corresponds with the object with the user profile may include associating the image features of the object class with a user identifier associated with the user profile within a database, such as the database 120. For example, by referencing a plurality of object features, a user identifier that corresponds with a user profile may be identified.

Figure 5:
FIG. 5 is a flowchart illustrating a method for presenting AR content, according to certain example embodiments.

FIG. 5 is a flowchart illustrating a method 500 for presenting AR content, according to certain example embodiments. Operations of the method 500 may be performed by the modules described above with respect to FIG. 3. As shown in FIG. 5, the method 500 includes one or more operations 502, 504, 506, and 508, that may be performed as a part of the method 400 depicted in FIG. 4. For example, the method 500 may be performed subsequent to the method 400 depicted in FIG. 4.

At operation 502, the image module 302 detects a display (i.e., a second display) of the object at a second client device 102. For example, the second client device may be associated with a second (i.e., different) user, from the user associated with the object class corresponding with the object.

At operation 504, the machine-vision module 304 detects the object within a presentation at the second client device 102, and identifies the object class that corresponds with the object based on the image features of the display of the object.

At operation 506, based on the identification of the object class of the display of the object, the AR module 306 retrieves an identifier associated with the user profile associated with the object class. For example, the AR module 306 may reference the database 120 based on the image features of the second display of the object, and the object class in order to determine a user profile associated with the object class.

At operation 508, the AR module 306 causes display of the identifier associated with the user profile at the second client device 102. For example the identifier may be presented as AR content that may include an overlay presented upon a presentation of image data at the second client device 102.

As an illustrative example from a user perspective, assume that an object class (e.g., coffee mugs) has been associated with a user identifier of a first user. A second user display a presentation of image data at a client device, wherein the presentation of the image data includes a display of a coffee mug. The addressable media system 124 detects the display of the coffee mug and identifies an object class that corresponds with the coffee mug. Based on the object class (or the image features), the addressable media system 124 references the database 120 to retrieve the user identifier of the first user.

Responsive to retrieving the user identifier of the first user, the addressable media system 124 generates AR content to be presented at the second client device, based on the image features of the object (the coffee mug), and the identifier of the first user. The AR content may include a display of the identifier of the first user at apposition relative to the coffee mug. For example, the AR content may include a display of the identifier of the first user on a surface of the coffee mug, such that from the perspective of the second user through the second client device, it appears that the identifier of the first user is written on the surface of the coffee mug.

Figure 6:
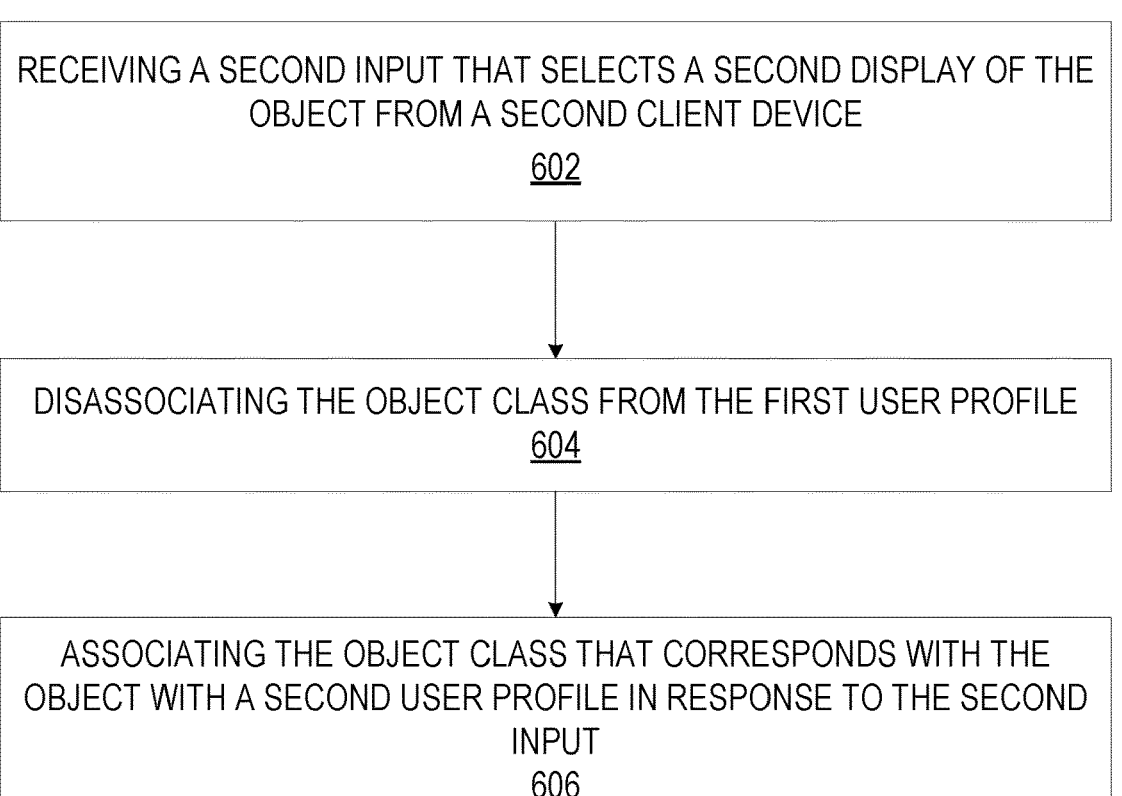
FIG. 6 is a flowchart illustrating a method for associating an object class with a user profile, according to certain example embodiments.

FIG. 6 is a flowchart illustrating a method 600 for associating an object class with a user profile, according to certain example embodiments. Operations of the method 600 may be performed by the modules described above with respect to FIG. 3. As shown in FIG. 6, the method 600 includes one or more operations 602, 604, and 606, that may be performed as a part of the method 400 depicted in FIG. 4.

In some embodiments, the addressable media system 124 may require a user to provide a threshold number of selections of an object in order to associate the object class of the object to their user profile. The addressable media system 124 may include a gamification component in which users are encouraged to select as many of a certain object as possible in order to associate the corresponding object class with their user profile. For example, a user from a group of users with the greatest number of selections of a particular object may result in the object class of the object being associated with their user profile. The group of users may be defined based on a user's social network connections or based on a group of users located within a geo-fenced area during a predefined time period.

Accordingly, at operation 602, a user (i.e., a second user) of a client device 102 (a second client device) may provide an input that selects a display of an object. For example, an object class of the object may have previously been associated with a user profile of a first user, based on selections made by the first user.

In certain embodiments, responsive to determining that the second user has selected a greater number of objects of the object class, at operation 604, the AR module 306 disassociates the user profile associated with the first user with the object class, and at operation 606, associates the object class with a user profile of the second user. Thus, the user who has selected objects corresponding to the object class the greatest number of times may receive the association to the object class. In some embodiments, corresponding notifications may be presented at the client devices 102 of the first and second users responsive to the operations of the method 600 discussed above. For example, a notification may be presented to the client device of the second user indicating that the second user has selected the greatest number of objects of the object class.

At operation 602, responsive to detecting a change in the environment based on a comparison of the image data with the 3D model associated with the location or object depicted by the image data, the image module 302 accesses second image data that depicts a portion of the object or environment that corresponds with the part of the 3D model. For example, the image module 302 may access an image repository that comprises a collection of image data associated with the set of image attributes or location of the image data and the 3D model, wherein the collection of image data includes at least a second image data.

At operation 604, the modeling module 304 generates an update to a part of the 3D model effected by the change in the object or environment based on the plurality of image data including the second image data.

Figure 7:
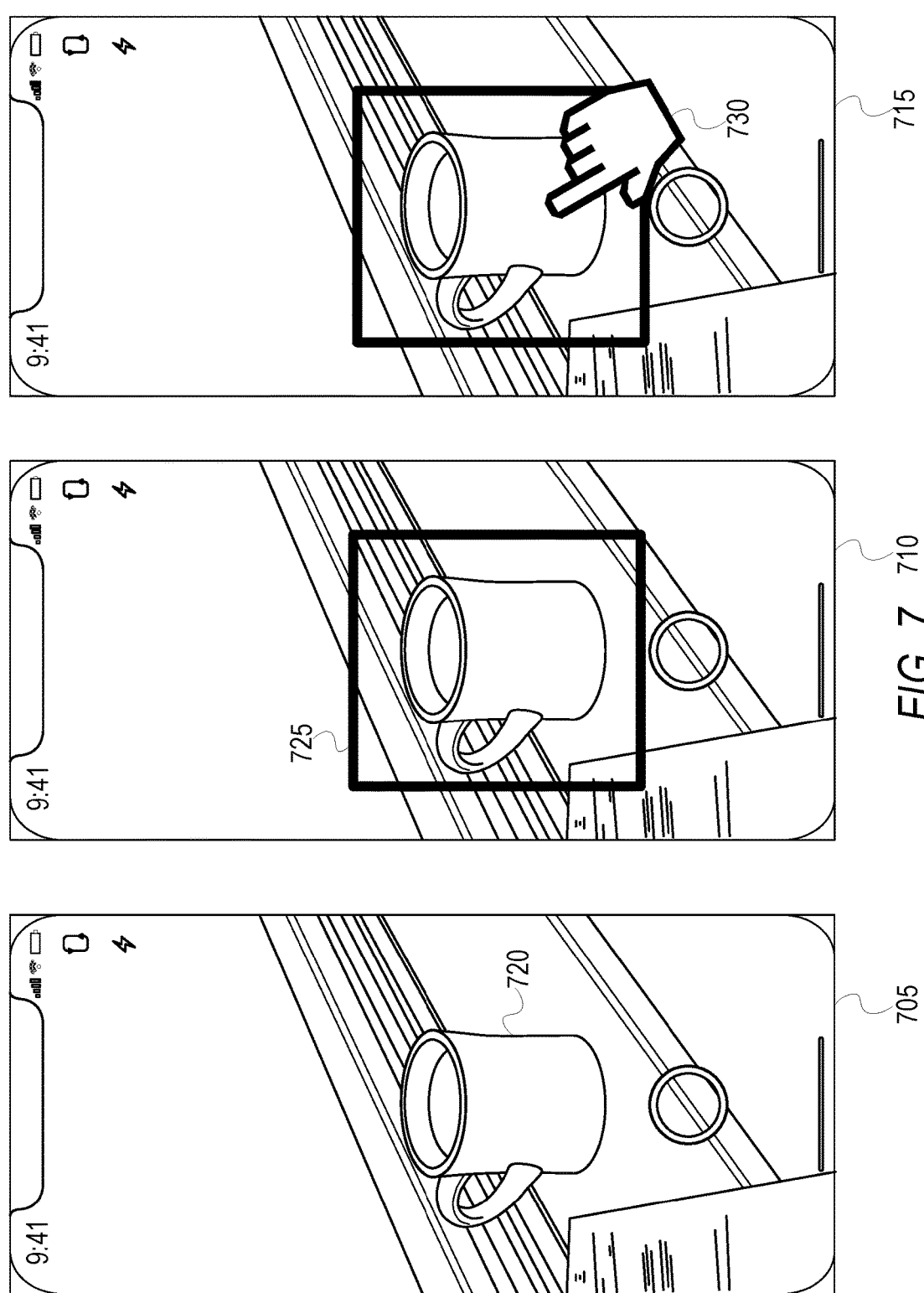
FIG. 7 is a flow diagram illustrating a method for addressing an object, according to certain example embodiments.

FIG. 7 is a flow diagram illustrating a method 700 for addressing an object, according to certain example embodiments, and as described in the method 400 of FIG. 4 discussed above.

As seen in operation 705 of FIG. 7, as discussed in operation 402 of the method 400, the image module 302 accesses image data that depicts an object 720 in an environment at a client device 102. The image data may comprise a data stream of image and video data captured by a camera associated with the client device 102. For example, the client device 102 may include a camera configured to generate and stream image data.

At operation 710, the machine-vision module 304 detects the display of the object 720 within the presentation of the image data at the client device 102 based on the image features of the display of the object and presents a bounding box 725 within the presentation of the image data, based on the position of the object 720. In some embodiments, the bounding box 725 may comprise one or more graphical properties, such as a size, shape, or color, wherein the graphical properties correspond to the object class of the object 720.

At operation 715, the presentation module 308 receives an input 730 that selects the display of the object 720 from the client device 102. For example, a user of the client device

102 may provide the input 730 as a tactile input that selects or otherwise identifies the display of the object 720 from within the presentation of the image data through the GUI. Responsive to the presentation module 308 receiving the input 730 that selects the display of the object, the AR module 306 associates the object class that corresponds with the object 720 with a user profile of the user.

Figure 8:
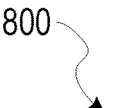
FIG. 8 is a diagram depicting a geo-fenced region, according to certain example embodiments.

FIG. 8 is a diagram 800 depicting a geo-fenced region 805, according to certain example embodiments. As discussed above, in certain embodiments the operations of the addressable media system 124 may be made available to users located within the geo-fenced region 805, such as the user 810. For example, as long as the user 810 is located within the geo-fenced region 805, the user may provide inputs selecting displays of objects that correspond with object categories. The user 810 may then be ranked against other users located within the geo-fenced region 805 in order to determine which user has selected the most displays of objects. Accordingly, the user (e.g., the user 810) that finds and selects the most displays of objects that correspond with an object category within the geo-fenced region 805 may be associated with the object category that corresponds with the object.

FIG. 9 is an interface diagram 900 depicting AR content 905 and 910 presented at a client device 102, according to certain example embodiments.

In some embodiments, the AR content (e.g., the AR content 905) may include a display of a user identifier, or message defined by a user. For example, a user associated with an object class may provide an input defining a message to be presented as AR content 905 to other users that encounter objects (e.g., object 720) of the object class.

In some embodiments, the AR content (e.g., the AR content 910) may include AR media presented as an overlay upon displays of objects that correspond with the object class associated with a user profile. For example, a user of the user profile may define the AR content 910 by selecting graphical elements or other media they choose to be presented as the AR content 910 to other users that encounter objects of the object class.

FIG. 10 is an interface diagram 1000 depicting AR content presented at a client device 102, according to certain example embodiments. As illustrated in FIG. 10, at operation 1005, a user may display a presentation of image data that includes a display of an object 1015. According to the method 500 of FIG. 5, responsive to detecting the display of the object 1015, and identifying an object class that corresponds with the object 1015, at operation 1010 the addressable media system 124 retrieves and presents AR content 1020, where the AR content 1020 may be defined by the user associated with the object class of the object 1015.

Software Architecture

Figure 11:
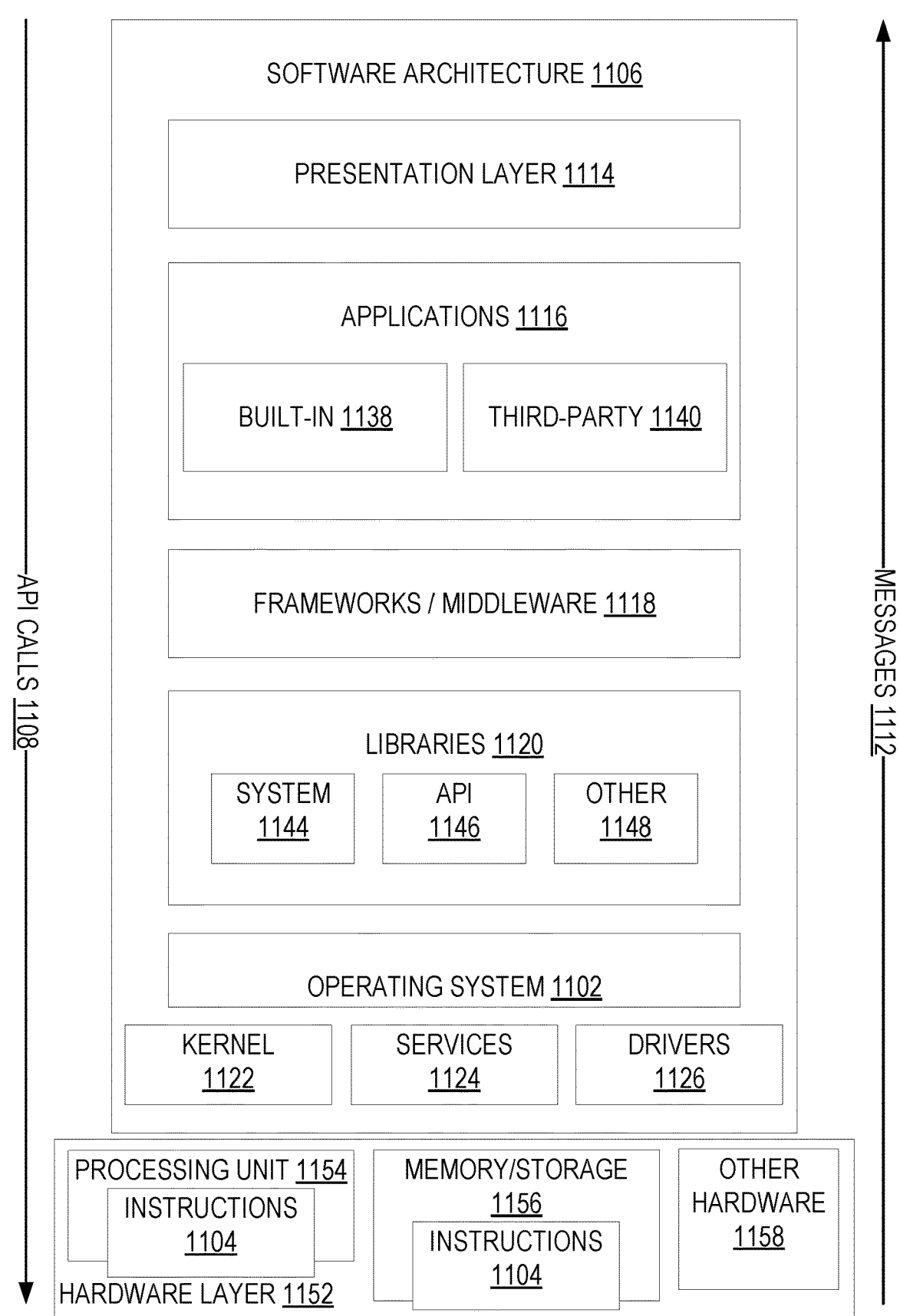
FIG. 11 is a block diagram illustrating a representative software architecture, which may be used in conjunction with various hardware architectures herein described and used to implement various embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as the machine 1200 of FIG. 12 that includes, among other things, processors 1204, memory 1214, and I/O components 1218. A representative hardware layer 1152 is illustrated and can represent, for example, the machine 1100 of FIG. 11. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke application programming interface (API) API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user.

Figure 12:
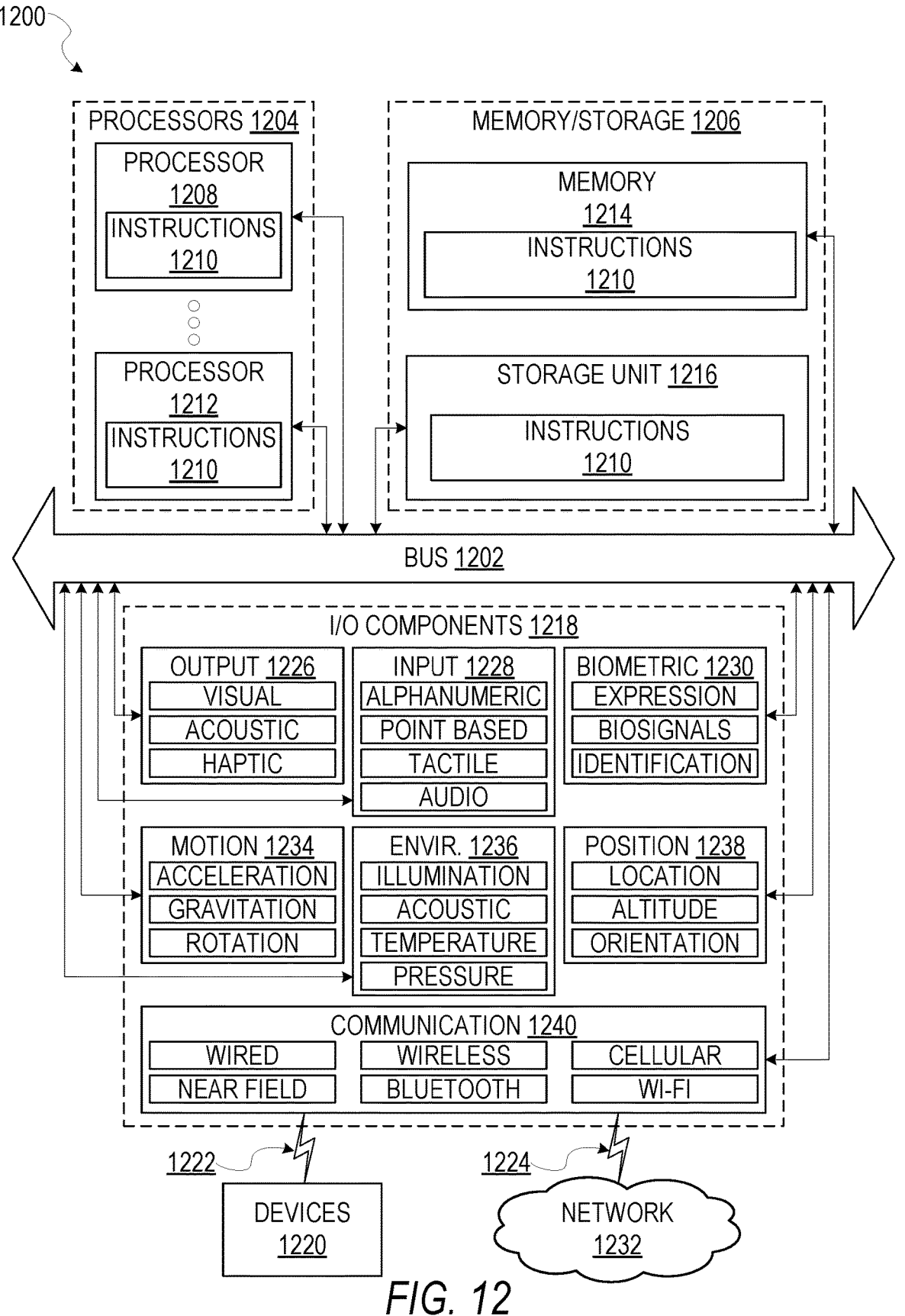
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:

detecting a client device within a geo-fenced area;

accessing image data at the client device responsive to the detecting the client device within the geo-fenced area, the image data comprising a set of image features;

detecting a display of an object within the image data based on the set of image features of the image data;

determining an object class that corresponds with the object;

presenting a graphical indicator that indicates the display of the object, the graphical indicator comprising a graphical property associated with the object class;

identifying, within a database, a user identifier associated with the object class based on a request received from a co-located client device within the geo-fenced area, the co-located client device corresponding with the user identifier that associates Augmented-Reality (AR) content with the object class received from a user that corresponds with the user identifier;

retrieving, from the database, the AR content associated with the object class based on the request received from the co-located client device; and causing display of a presentation of the AR content at the client device based on the display of the object and the user identifier associated with the object class.

2. The method of claim 1, wherein the AR content includes a display of the user identifier associated with the object class.

3. The method of claim 1, further comprising:

accessing the AR content at a user profile associated with the user identifier.

4. The method of claim 3, wherein the AR content comprises a text string defined by a user associated with the user profile.

5. The method of claim 1, wherein the determining the object class that corresponds with the object further comprises:

receiving an input that assigns the set of image features to the object class.

6. The method of claim 1, wherein the identifying the user identifier associated with the object class within the database further comprises:

receiving a request that includes an identification of the object and the user identifier; and associating the user identifier with the object class that corresponds with the object within the database.

7. The method of claim 1, wherein the detecting the display of the object based on the set of image features of the image data further comprises:

detecting the display of the object based on Viola-jones object detection and the set of image features.

8. A system comprising:

a memory; and at least one hardware processor coupled to the memory and comprising instructions that causes the system to perform operations comprising:

detecting a client device within a geo-fenced area;

accessing image data at the client device responsive to the detecting the client device within the geo-fenced area, the image data comprising a set of image features;

detecting a display of an object within the image data based on the set of image features of the image data;

determining an object class that corresponds with the object;

presenting a graphical indicator that indicates the display of the object, the graphical indicator comprising a graphical property associated with the object class;

identifying, within a database, a user identifier associated with the object class based on a request received from a co-located client device within the geo-fenced area, the co-located client device corresponding with the user identifier that associates Augmented-Reality (AR) content with the object class received from a user that corresponds with the user identifier;

retrieving, from the database, the AR content associated with the object class based on the request received from the co-located client device; and causing display of a presentation of the AR content at the client device based on the display of the object and the user identifier associated with the object class.

9. The system of claim 8, wherein the AR content includes a display of the user identifier associated with the object class.

10. The system of claim 8, further comprising:

accessing the AR content at a user profile associated with the user identifier.

11. The system of claim 10, wherein the AR content comprises a text string defined by a user associated with the user profile.

12. The system of claim 8, wherein the determining the object class that corresponds with the object further comprises:

receiving an input that assigns the set of image features to the object class.

13. The system of claim 8, wherein the identifying the user identifier associated with the object class within the database further comprises:

receiving a request that includes an identification of the object and the user identifier; and associating the user identifier with the object class that corresponds with the object within the database.

14. The system of claim 8, wherein the detecting the display of the object based on the set of image features of the image data further comprises:

detecting the display of the object based on Viola-jones object detection and the set of image features.

15. A non-transitory machine-readable storage medium comprising instructions that, when executed by one or more processors of a machine, cause the machine to perform operations comprising:

detecting a client device within a geo-fenced area;

accessing image data at the client device responsive to the detecting the client device within the geo-fenced area, the image data comprising a set of image features;

detecting a display of an object within the image data based on the set of image features of the image data;

determining an object class that corresponds with the object;

presenting a graphical indicator that indicates the display of the object, the graphical indicator comprising a graphical property associated with the object class;

identifying, within a database, a user identifier associated with the object class based on a request received from a co-located client device within the geo-fenced area, the co-located client device corresponding with the user identifier that associates Augmented-Reality (AR) content with the object class received from a user that corresponds with the user identifier;

retrieving, from the database, the AR content associated with the object class based on the request received from the co-located client device; and causing display of a presentation of the AR content at the client device based on the display of the object and the user identifier associated with the object class.

16. The non-transitory machine-readable storage medium of claim 15, wherein the AR content includes a display of the user identifier associated with the object class.

17. The non-transitory machine-readable storage medium of claim 15, further comprising:

accessing the AR content at a user profile associated with the user identifier.

18. The non-transitory machine-readable storage medium of claim 17, wherein the AR content comprises a text string defined by a user associated with the user profile.

19. The non-transitory machine-readable storage medium of claim 15, wherein the determining the object class that corresponds with the object further comprises:

receiving an input that assigns the set of image features to the object class.

20. The non-transitory machine-readable storage medium of claim 15, wherein the identifying the user identifier associated with the object class within the database further comprises:

receiving a request that includes an identification of the object and the user identifier; and associating the user identifier with the object class that corresponds with the object within the database.

* * * * *